(12) United States Patent
Mattes et al.

(10) Patent No.: US 7,590,264 B2
(45) Date of Patent: Sep. 15, 2009

(54) QUANTITATIVE ANALYSIS, VISUALIZATION AND MOVEMENT CORRECTION IN DYNAMIC PROCESSES

(75) Inventors: Julian Mattes, Thierburgweg 24, Fritzens (AT) 6122; Roland Eils, Strahlenberger Strasse 26, Schrieshelm (DE) 69198; Johannes Fieres, Alte Eppelheimer Str. 84, Heidelberg (DE) 69115; Jacques Demon-Geot, Sassenage (FR)

(73) Assignees: Julian Mattes, Heidelberg (DE); Roland Eils, Schrieshelm (DE); Johannes Fieres, Heidelberg (DE); Universite Joseph Fourier, Grenoble (FR)

( * ) Notice: Subject to any disclaimer, the term of this patent is extended or adjusted under 35 U.S.C. 154(b) by 772 days.

(21) Appl. No.: 10/471,153

(22) PCT Filed: Mar. 8, 2002

(86) PCT No.: PCT/EP02/02580

§ 371 (c)(1),
(2), (4) Date: Dec. 9, 2004

(87) PCT Pub. No.: WO02/071333

PCT Pub. Date: Sep. 12, 2002

(65) Prior Publication Data

US 2006/0034545 A1    Feb. 16, 2006

(30) Foreign Application Priority Data

Mar. 8, 2001    (DE)    ................................. 101 11 226
Sep. 11, 2001   (DE)    ................................. 101 44 629

(51) Int. Cl.
*G06K 9/00* (2006.01)
*G06K 9/32* (2006.01)
*G05B 19/18* (2006.01)

(52) U.S. Cl. ...................................... 382/107; 382/294
(58) Field of Classification Search ................. 382/103, 382/107, 151, 206, 294; 348/97, 154, 155; 700/47, 124; 702/23, 129; 717/105, 109, 717/113, 125
See application file for complete search history.

(56) References Cited

U.S. PATENT DOCUMENTS 5,611,000 A * 3/1997 Szeliski et al. ............... 382/294
6,169,817 B1 * 1/2001 Parker et al. ................. 382/131

FOREIGN PATENT DOCUMENTS

DE    199 30 598 A    7/2000

OTHER PUBLICATIONS

Yamamoto M et al. "Human Action Tracking Guided By Key-Frames", Niigata University, IEEE, Mar. 28, 2000, pp. 354-361.

(Continued)

*Primary Examiner*—Abolfazl Tabatabai
(74) *Attorney, Agent, or Firm*—Westman, Champlin & Kelly P.A.

(57) ABSTRACT

The invention relates to the quantitative analysis and/or visualization (virtual or real) of moving processes and to the detection, description, correction and the comparison of global movements inside the image space. The invention particularly relates to a method and device for precisely and, while being limited to few parameters, quantitatively describing the global and local movement occurring in the image space and for the single representation of the movement of the quantitative parameters with regard to the image space. A rough to fine recording and a detection of and compensation for global movements occurs whereby enabling a tracking and a corrected visualization. The detection of the movement, which corresponds as precisely as possible to the real movement occurring in the image space is effected by a splines a plaques minces recording technique that enables the number of movement parameters to be kept low. A fully automatic execution of all partial steps is made possible.

12 Claims, 12 Drawing Sheets

OTHER PUBLICATIONS

Figure 4:
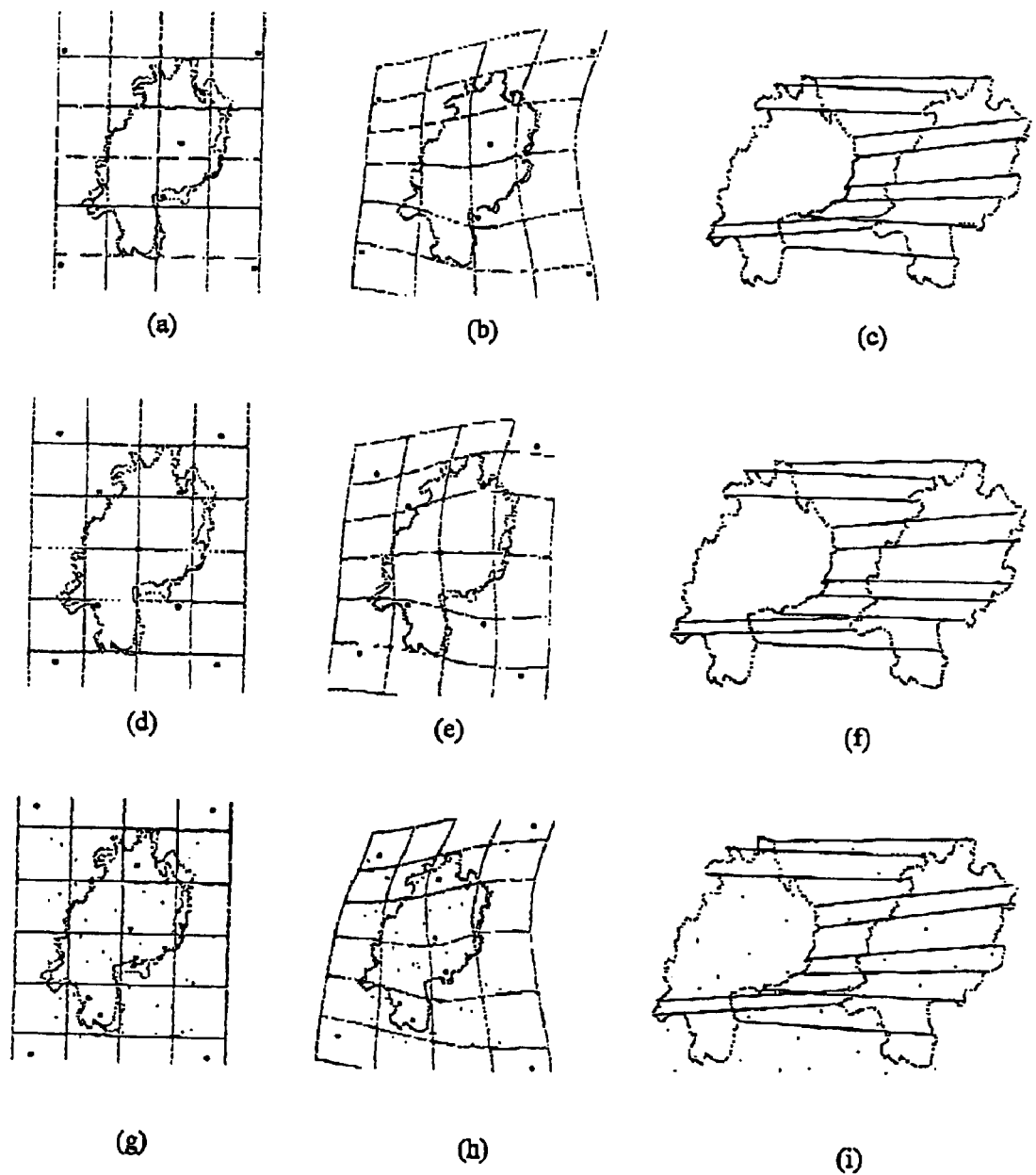

Cootes T.F. et al., "Active Shape Models—Their Training and Application", *Computer Vision and Image Understanding*, vol. 61, No. 1, January, pp. 38-59, 1995.

Mattes, J. et al. "Tree Representation and Implicit Tree Matching for a Coarse to Fine Image Matching Algorithm", Medical Image Computing and Computer-Assistated Internvention, Sep. 19, 1999, pp. 646-655.

Feldmar J. et al., Rigid Affine and Locally Affine Registration of Free-Form Surfaces, *International Journal of Computer Vision*, Bd. 18, Nr. 2, May 1, 1996, pp. 99-119.

Park D. et al., "Segmentation via Multiple Looks of Image Sequences Using the A Priori Probability Mask", Nov. 1988, *Maple Press*, pp. 528-532.

International Preliminary Examination Report along with English translation.

* cited by examiner

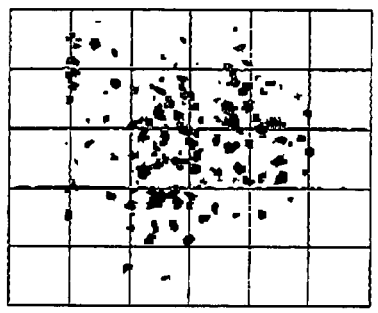
a) before (rigid) registration
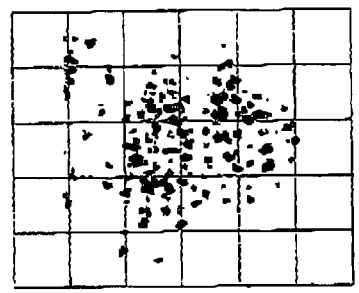
b) a intermediate step in the registration
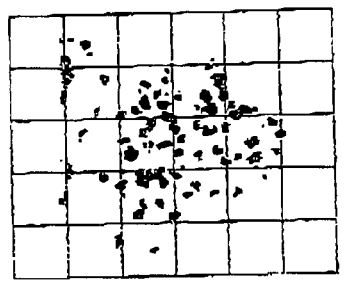
c) after registratiom
Figure 1: The marked centrosomes on chromosomes in a moving cell nucleus. Green: first time step, Rosa: second time step. The correspondences cannot be found before the automatic global registration by means of a tracking method, but become obvious afterwards.

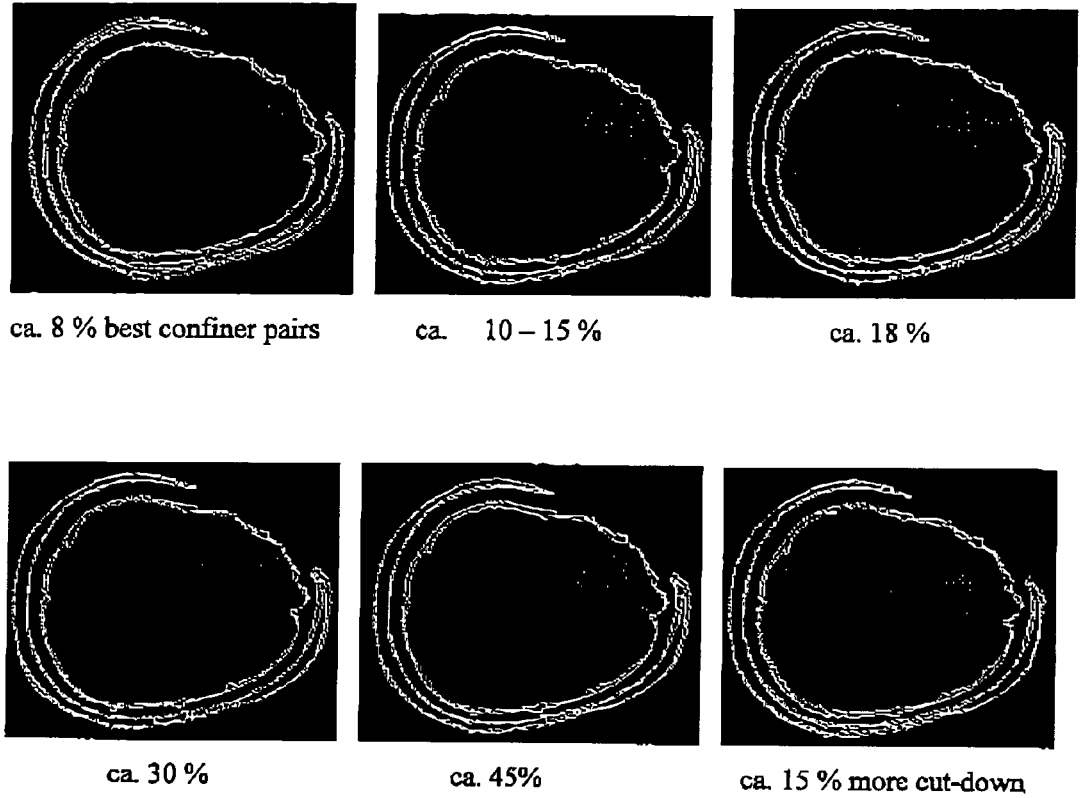

Figure 2: Registration results for affine registration on the basis of confiner centers of confiner pairs having the smallest relPos error. In the right Figure second line, about 120 pairs are maintained, in the other Figures 190. The best results were achieved for 10-15% maintained confiner pairs, they are (visually) almost identical. In order to broaden the range, a method is under examination which first determines the density of the relPos-distribution for all confiner pairs and then selects on the basis of the highest density.

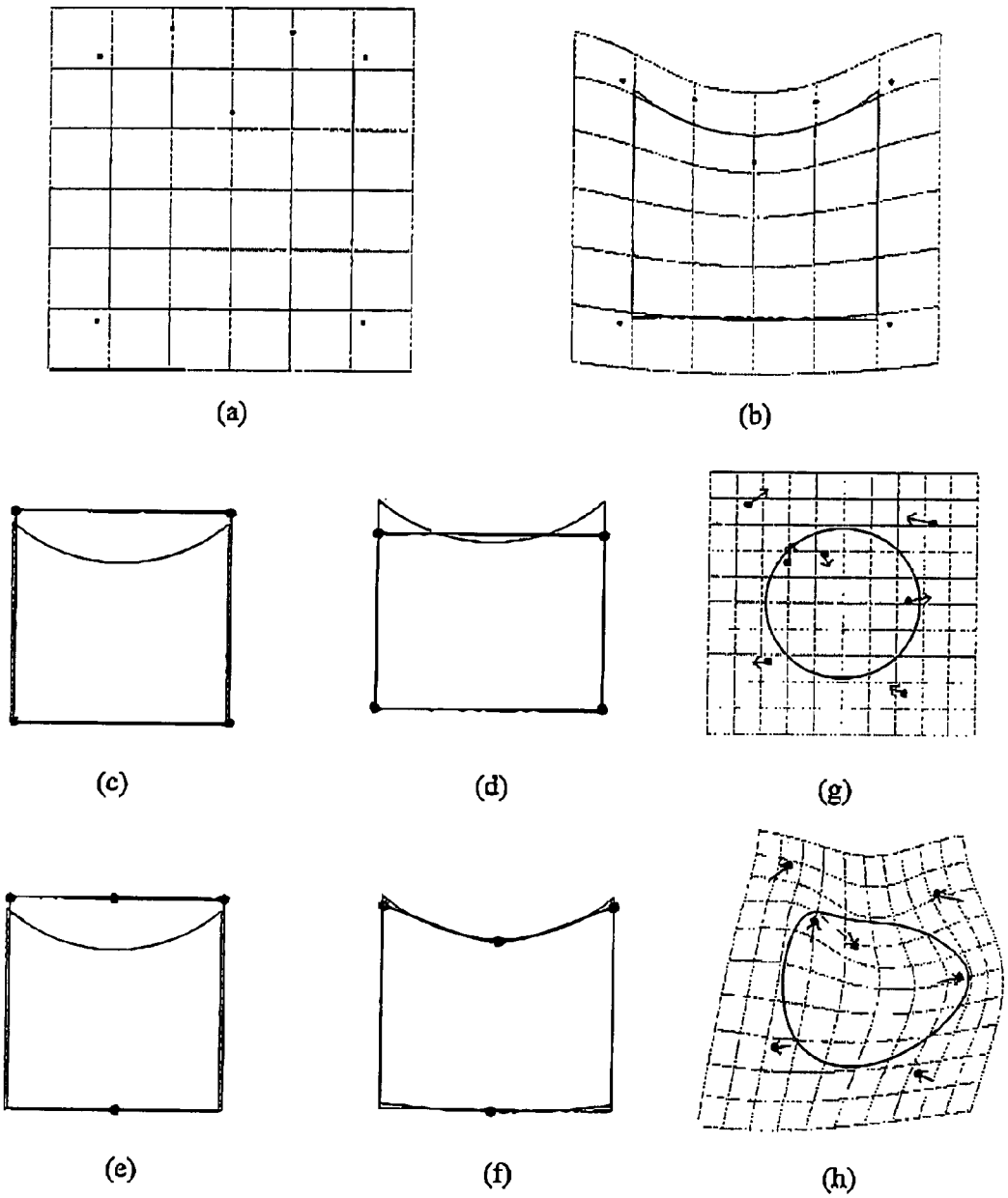

Figure 3: An appropriate selection of the original check points (A landmarks) facilitate a realistic (natural) motion: Here (a, b) this corresponds to deformations, which occur when, for example, a rubber block is pressed from the upper side; especially on the upper surface a heavier deformation occurs as on the inferior surface. (c-f) Influence of the position of the A landmarks (at equal numbers) on the result: data set in black, reference set in rosa. (g, h) Illustration of the effect of 2D thin-plate splines for given checkpoints and their displacement vectors.

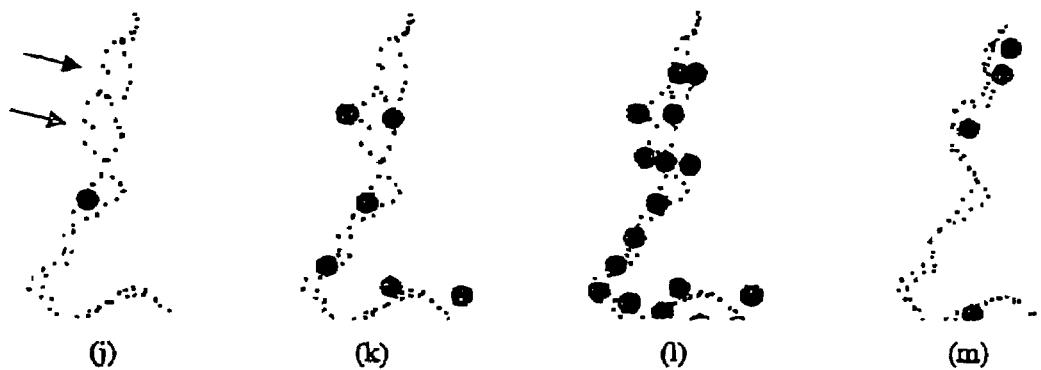

Figure 4: Non-rigid registration (after affine pre-registration) of the original borderline of Hessen and an artificial deformation of this line. Left hand side: data points (black) and model points (rosa) before registration. The A landmarks are represented by little balls. Middle: after registration. Right hand side: only affine deformed data point set as well as model points (not deformed), whereby the spatial correspondences found by the registration algorithm are indicated by connecting lines.

(a-c) Cluster-method for the determination of the A landmarks: The shown 9 A landmarks were introduced stepwise during the registration according to the described coarse-to-fine scheme. (d-f) The 9 A landmarks were set by the octree-method. Attention is drawn to the wrong overlapping on the entire right side of the figure. (g-i) Similar to (a-c), only that to each point set 10% disturbing points were added at random. The correspondences are still correctly found as in (a-c), but more A landmarks were necessary.. (j-m) Detailed view of another example. (j-l) Octree-Method. By a stepwise increase of the degrees of freedom the point sets become increasingly closer to each other but the shape is destroyed. The arrows in (j) point to the locations which should be overlapped. (m) Correct registration of the same region by the cluster method using considerably less checkpoints (degrees of freedom). More degrees of freedom improve the result.

Figure 4 continued

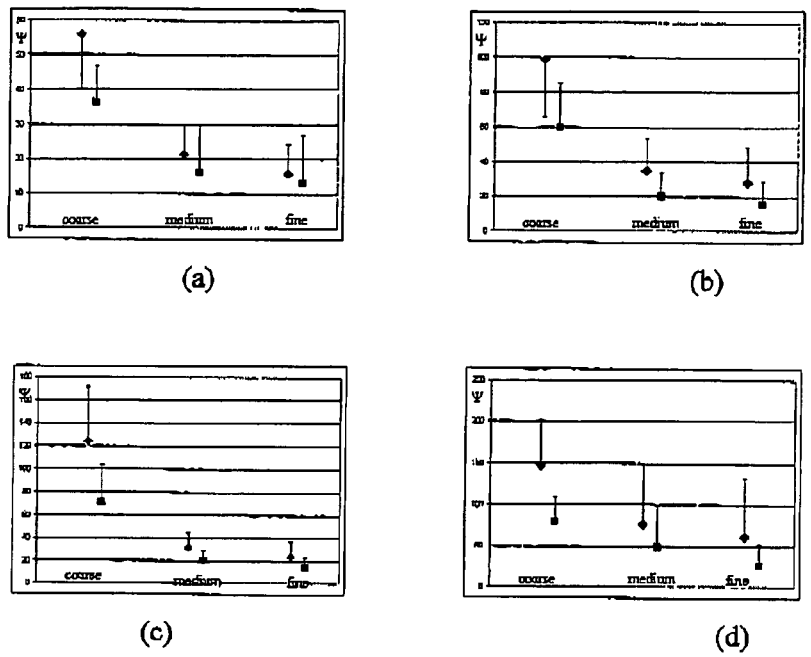

Figure 5: Results of 2D registration with known exemplary solution. Each symbol corresponds to a series of 35 registrations (over all more than 800 individual experiments). Shown are the average values of the deviations of transformed (by means of registration) points from the exemplary solution (with a bar representing a half of the standardized deviation). A lower value belongs to a better registration. The checkpoints of the known random deformation (interpolated with Gauss nuclei) were displaced by an average of 10 (a), 13 (b), 15 (c) and 18 (d) length units. In each diagram, the two symbols on the very left side correspond to a registration on the most coarse level (octree level 3 or 9 checkpoints), those in the middle to a registration on a middle level (ON 4 or 21 KP) and those on the very right side to a registration on a fine level (ON4 or 53 KP).

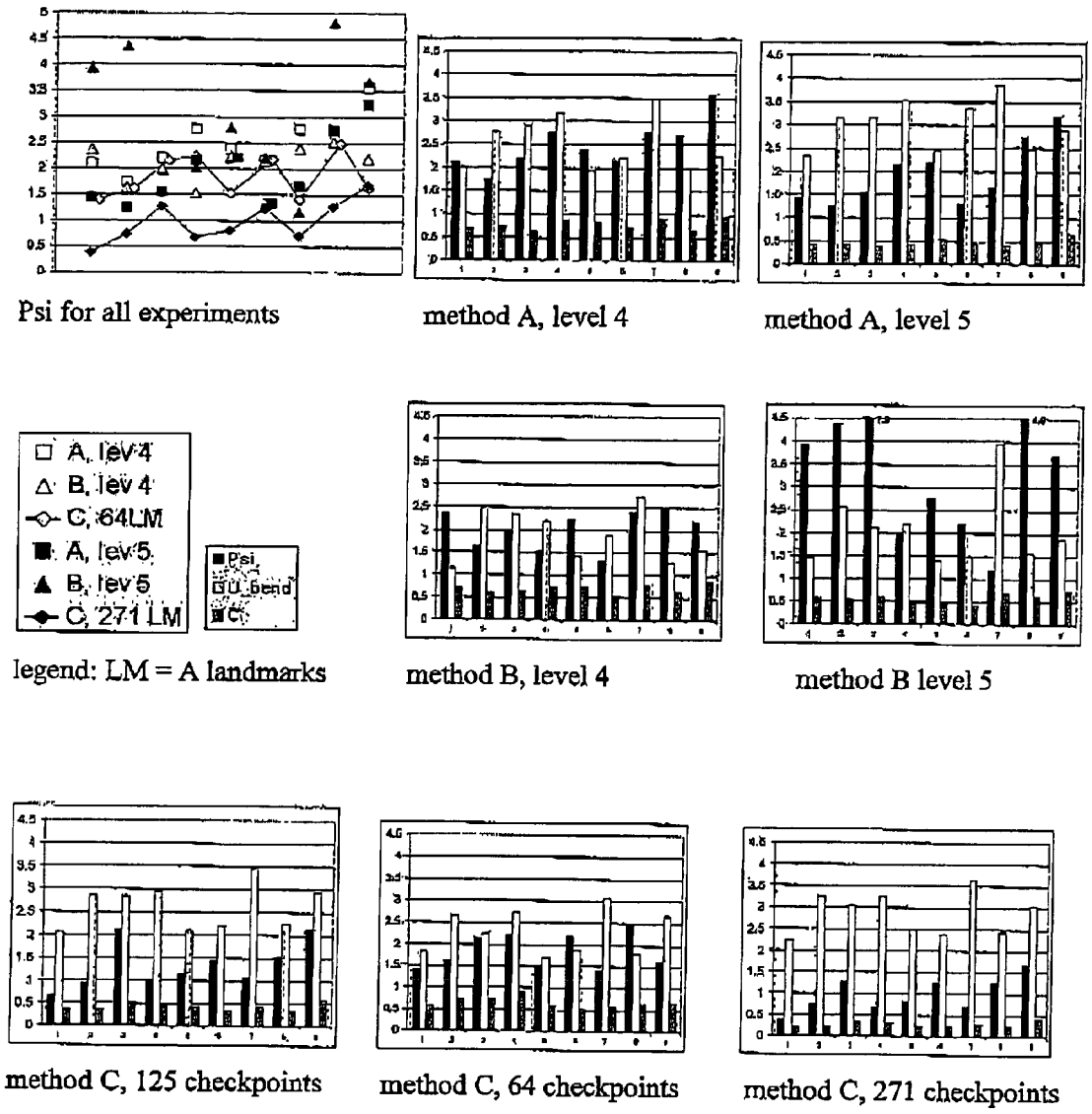

Figure 6: For each of 3 different motion models, 9 individual registrations were performed and evaluated (by means of the deviation Psi to the exemplary solution as in the preceeding Figure, the bending energy U_bend and the value of the error functional C): Methods A und C are those methods compared already in the preceding Figure for the determination of the A landmarks (A octree method, C cluster method), method B is a variant of method A, which immediately registers on the finest level, but starts instead with a very high regularisation parameter and then decreases it stepwise.

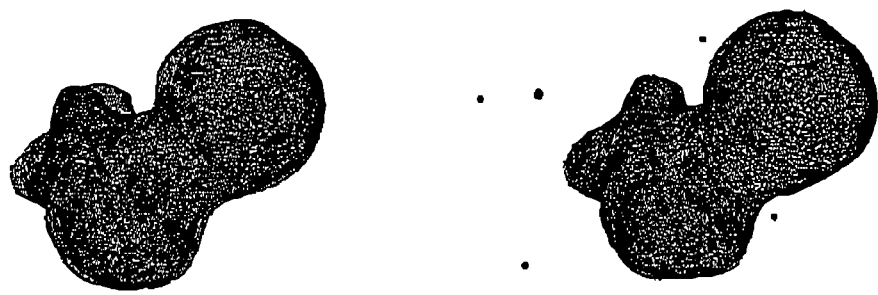
Figure 7: 3D example: Femur bone before (left sides) and after (right side) a non-rigid registration, whereby A landmarks were set according to the cluster method. Compared with the octree method 60% of the A landmarks could be omitted.

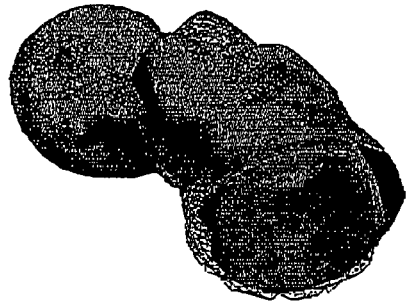

c) Error with respect to affine reference transformation

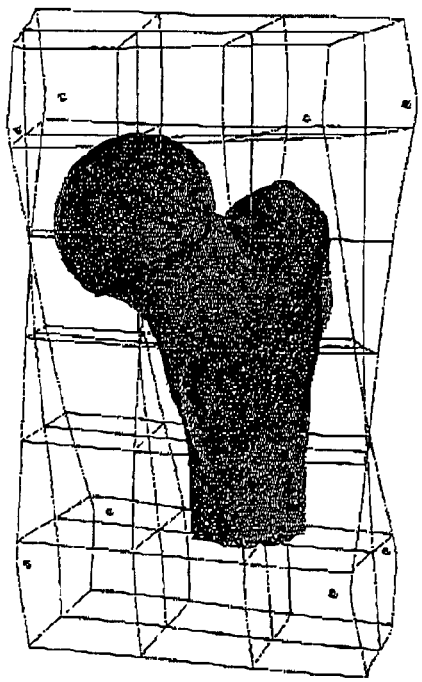
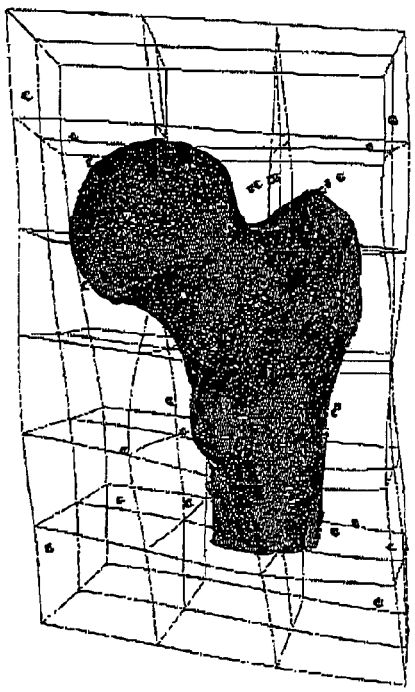

a) registration with 8 check points     b)  registration with 67 check points

Figure 8: Visualization of the motion. a + b) The spatial motion becomes obvious by the reference grid, which can also be represented animatedly. The global (not affine) distortion of the superior with regard to the inferior half of the femur bone can clearly been seen in a). By the finer registration in b) the small trocantor (in the inferior half) is better overlapped, the global distortion is less obvious than in a), but the local one more clearly. The error with regard to the best fitting affine transformation is represented by colour encoding in c).

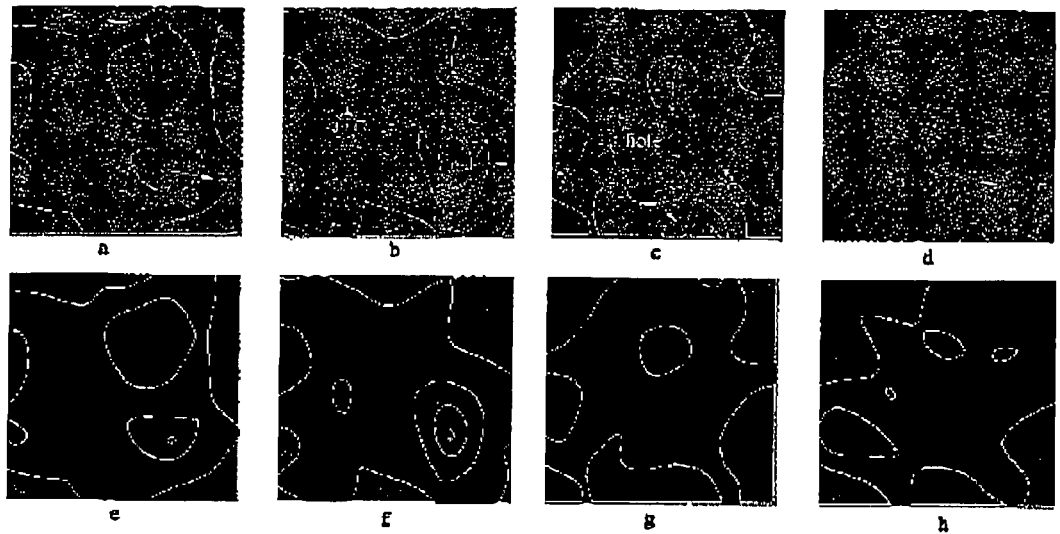

Figure 9: Upper Row: image series of a cell nucleus surface (lamina) during its break down in the mitosis cycle. A hole develops in the lamina at the point marked in c, also visible in d. In the lower row, the velocities each belonging to two subsequent time steps (e belongs to a and b, f to b and c, etc.) and calculated by the described registration technique are encoded by grey values for each point of the image level. The motion is characterized by the confiners of the absolute values of the velocities. The outer shapes of such confiners are made visible as lines. Within which, the motion is homogeneous. Before the development of the hole, it is more homogenous and directed in such a manner, that a high tension occurs where in the following the hole develops. At this very location, the velocity is lowest (almost black) in f. After the development of the hole, the motion losses homogeneity: there is a plurality of small confiners.

Figure 10: Paths according to visualisation module 4b)

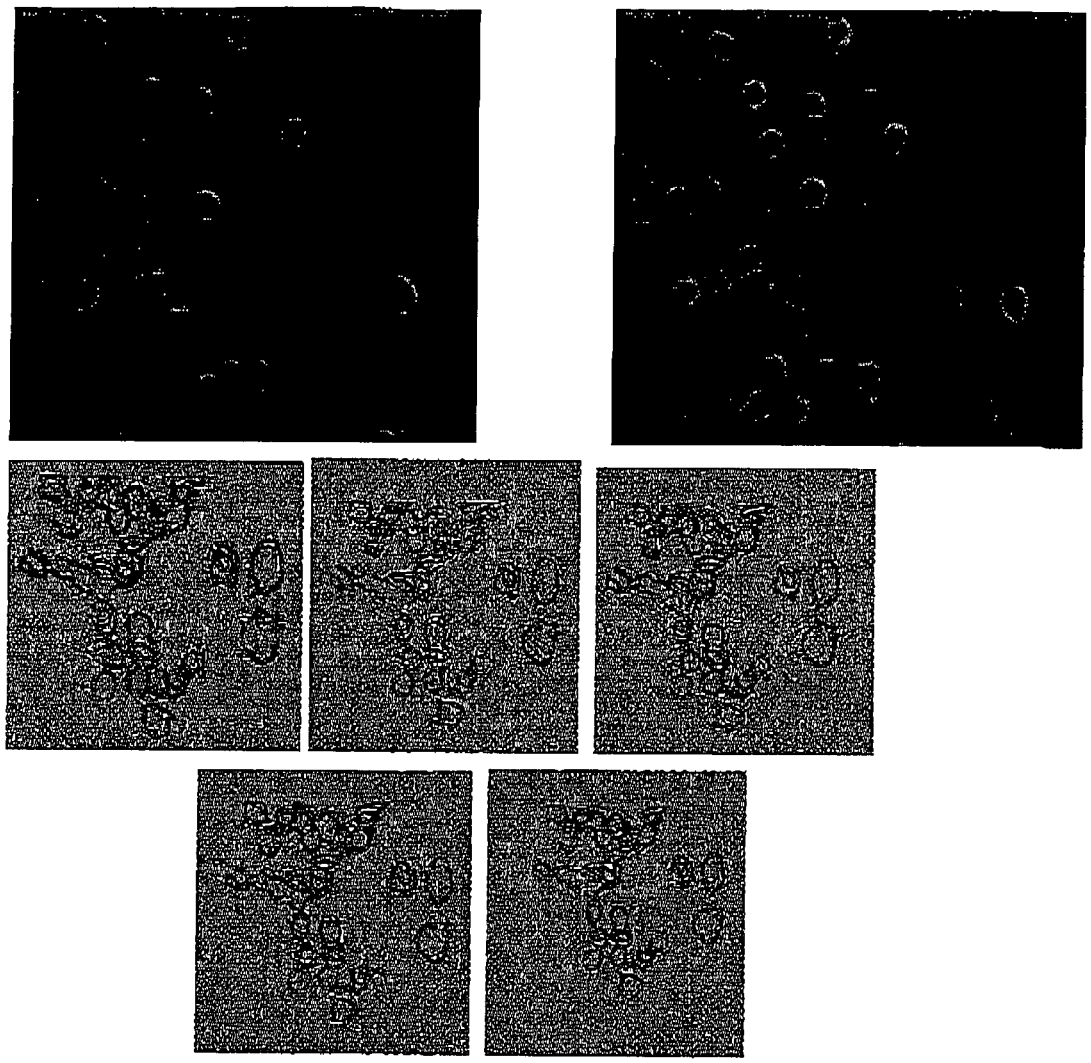
Figure 11 Above: Two images of a time series of moving cells; middle and below: by means of relPos selected confiner pairs (the shape of which are here visualized, mirror-inverted, in white: outlier points); middle (from the left to the right): initial overlapping, registration with 5, 7 check points; below: registration with 11 and with 17 check points

QUANTITATIVE ANALYSIS, VISUALIZATION AND MOVEMENT CORRECTION IN DYNAMIC PROCESSES

CROSS-REFERENCE TO RELATED APPLICATION

This Application is a Section 371 National Stage Application of International Application No. PCT/EP02/02580, filed 08 Mar. 2002 and published as WO 02/071333 on 12 Sep. 2002.

The invention relates to the quantitative analysis and/or visualization (virtual and real) of moved processes, as well as the registration, description, correction and the comparison of global motion mechanisms within the image space (time space). In particular, it relates to a method and an apparatus for a precise and limited to a few parameters (concise) quantitative description of the global and local motions taking place in the image space (not only of objects but also within and between the objects) and for a catchy representation of the motions and the quantitative parameters in relation to the image space. Here, a virtual moved process is understood as the sequencing of images (or point sets) of comparable objects (e.g., same organs of different individuals). The quantitative analysis, visualization and motion correction in dynamic processes facilitates to develop an improved understanding of the reasons of the motions, to predict and to find the interrelation between motion parameters and conditions. An example is the investigation of elasticity properties of cell structures.

Due to the availability of imaging apparatuses, new possibilities have developed to compare object (more general: materials/substances) or to analyze different conditions or motions of an object and to visually present them in a catchy way (easily to understand). This can be performed by a computer and be automated. Great advances have been achieved in the extraction and presentation of surfaces and also in the calculation of velocity fields. For images showing multiple objects lying side by side, new methods were suggested, to track the individual objects and to visualize the path of said objects by 3D rendered (surface rendering) lines or tubes.

Global motion mechanisms overruling the motion of the individual objects, will result in a wrong assignment of the object in the different images and thus in wrong paths. Difficulties will also be created by great local displacements from one image to the next, which make the determination of the motions based only on gray values (e.g., optical flow methods) very difficult. Both cases occur, e.g., if, in favor of the space resolution, the time resolution was chosen not particularly fine.

The precise and concise quantitative description of the motion is a further difficulty which goes far beyond the calculation of velocity fields. Here it is to detect the global motion type and to describe it quantitatively with a few parameters as well as to detect (especially if no overruling global dynamic prevails) only a few locally different motion types and to separate these spatially; and finally to evaluate local phenomena. The concise description simplifies the comparison of different motions in different image series. It is a special problem in images having only a reduced structure, i.e., having only at a few parts of the surface of only a few objects a non-uniform gray value structure, to reconstruct the motion which corresponds to the real motion taking place in the image space. If (non-rigid but) relatively global deformations occur, it is a problem to define a motion model which does not destroy local structures of the image/the surface shape and being tolerant against noise or points, which do not belong to the investigated object.

In the prior art, it is suggested to use methods for the determination of the optical flow, particle tracking as well as surface tracking and registration for analyzing and visualizing moved processes.

Optical flow methods (for an overview see Barron J. L. et al., Performance of optical flow techniques, Int. J. Comp. Vision, 12: 43-77, 1994) are based on the assumption that the optical densities (intensities) remain unchanged over the time. They calculate for each image point a motion vector and thus allow to quantify the velocities for each point in space and time and to visualize it in a velocity vector field. But they do not allow a continuous visualization (over more than 2 images) and they require that the difference in time is small in comparison to the local changes of the structures in the image as well as no changes in the illumination or other disturbances occur over the time and they are locally formulated (using a regularization term).

An exception is described in F. Germain et al. (Characterization of Cell Deformation and Migration using a parametric estimation of image motion, IEEE Trans. Biomed. Eng., 46, 584-600, 1999) wherein the parameters of an affine motion model is calculated and analyzed. This calculation and analysis is effected only locally over the time, i.e., it is separately performed for each two time steps. Thus, it is, e.g., not possible to quantify the difference if objects are deformed continuously in the same direction or each in different directions. But this is essential for the resulting deformation of the object. The present invention allows a continuous quantitative analysis and furthermore provides the opportunity to visualize the deviation with respect to the reference dynamic for each point—also for global deformations being described with more degrees of freedom than for a an affine image, and for local motions.

In particle tracking (Eils, Tvarusko und Bentele, Zeitaufgelöste Analyse und/oder Visualisierung dynamischer Prozesse in dynamischen biologischen Systemen, publication GPTO 199 30 598.6, 1998/9) beforehand extracted object (or object centers) are tracked within series of images, the dynamic of said objects is quantified and their paths are continuously shown. For this purpose, it is essential to detect the individual objects and to identify (to relocate) them in subsequent images. This is facilitated by a combination of the criteria of object proximity and object similarity (similar area, average gray value etc.). These methods (especially the method according to Eils et al.) fail, if all objects are similar, if for a time step an object has not been segmented (detected) and if the dynamic of the individual particle is overruled by a global dynamic. This situation is shown in FIG. 1. The method of the present invention which also comprises a registration step allows a correct detection of the motion also in these cases and presents in the part of visualization and quantification new and improved possibilities especially for complicated image structures (animated, 3D rendered reference grid, use of characteristic image/surface points the 3D rendered paths of which are shown, the path through an interactively choosable point which can be located at any arbitrary point in the time-space, the determination of homogenous or locally especially strong motions etc.). In the following the words "matching" (and "to match") are used in the sense of registration, i.e., the determination of parameters of a motion model, by which an image (or an object) is transformed in a manner that it transforms as best as possible into another, and not as in Eils et al. in the sense of the identification (relating) of points from two sets of points, e.g., surface points of two surfaces.

In J. M. Odobez and P. Bbuthemy, Detection of multiple moving objects using multiscale MRF with camera motion compensation, ICIP'94, a method for the analysis (object detection) of moving processes is suggested, which includes the compensation of the global camera motion. Here the global motion is compensated only implicitly in order to calculate the optical flux field without presenting the opportunities of a motion compensated visualisation or to visualize the object paths (neither with correction of the global motion nor object paths at all) and without comprising a two-step-strategy by which the compensation of the global motion only facilitates the local identification of objects in a second step.

The correction of motions can also be necessary if areas with changed gray values (e.g., in angiograms) in images of moving objects (e.g., patients) should be detected. I. A. Boesnach et al. (Compensation of motion artifacts in MR mammography by elastic deformation, SPIE Medical Image 2001) suggest an approach of local registration for compensating the patient's motions, which allows to distinguish areas of increased concentration of radiopaque material from areas of changed gray values caused by motions. This approach also comprises no continuous visualization and furthermore only a local registration and thus has no means to quantify, visualize and compensate global (reference) dynamics. It is also not suitable and not designed for the tracking of image series which also contain global dynamics.

For the visualization of dynamic parameters during the motion of surfaces, the surfaces are encolored in such a manner that the length of the motion vectors are shown in a color-encoded manner (Ferrant et al., Real-time simulation and visualization of volumetric brain deformation for image guided neurosurgery, SPIE Medical Imaging 2001). During registration, only the surface but not the entire space has been transformed. Here, we do not only suggest a more complete visualization concept, which includes the entire image space, but also visualizes parameters which can only be obtained as a result of the entire method.

In order to overlap data sets of different steps in time, often point data are extracted from image data (in case point data are not already available, as with contact scanners), on the basis of which the overlapping is determined. Mattes and Demongeot (Structural outliner detection for automatic landmark extraction, SPIE Medical Imaging 2001, Vol. 4322 I: 602-610) extract the shapes from confiners. These are defined for a given gray value density function as the maximum cohering partial sets of the level-sets. They define (by amount inclusion) a tree-structure (confinement-tree) if they are extracted for various gray value levels including the zero-level. Irrelevant confiners can then be deleted by screening the tree. For two gray value images first pairwise corresponding confiners are searched, the correspondence of the confiners of a pair is evaluated and then the pairs having a too low correspondence are deleted. On the basis of the remaining pairs (e.g., of their centers or shapes) the images are overlapped. Up to now, there is no evaluation for an iterative use of this method, which could also investigate the importance of the parameters (e.g., the number of deleted confiner pairs or the number of cut-down confiners).

In order not to rigidly overlap the points extracted in that manner, a motion model has to be given. Szeliski and Lavallèe (IJCV 1996) use trilinear B-splines the control points of which are arranged around the extracted point set on an octree grid, having a higher resolution near to the surface. By means of the various levels in the octree first a few and then increasingly more check points can be used, thus leading to an registration from "coarse to fine". In order to precisely overlap the point sets, however, (due to the insufficient smoothness of the trilinear B-splines) a lot of check points are necessary (i.e., a lot of degrees of freedom of the transformation are necessary), which additionally have to be arranged in accordance with the regular octree scheme and cannot be arbitrarily distributed in the space. The registration with a too high number of degrees of freedom incorporates the risk to destroy local structures and to obtain very sensitive regularization parameters.

Chui and Rangarajan (CVPR 2000) use thin-plate spines and each extracted point as check point. But this is, due to the calculation time needed, only sensible for small point sets. We will suggest a method for setting check points which allows to precisely find the desired motion with particularly few degrees of freedom. It has the advantage, besides the reduced calculation time, that, on the one hand, the destroying of local form characteristics and the fitting of noise can be avoided in a better way and, on the other hand, the regularization parameters have less importance (smaller sensitivity), as the transformation with less parameters is smoother, anyway. Additionally, the user receives a more concise description of the motion, which can also be advantageous for subsequent steps, e.g., establishing an active shape model (see below) on the basis of the initial and final positions of the check points.

In summary, the present invention has the advantage besides the (afore-described) better and more concise quantitative detection of the motion, especially if extended local deformations occur, to facilitate a continuous time-space-visualization even within complex objects (and at their surfaces) and to avoid thereby the error source of object detection. The method described herein also facilitates the detection of regions of homogeneous motion.

The "active shape model" (ASM) or point distribution model (PDM) was introduced by T. F. Cootes, C. J. Taylor, D. H. Cooper and J. Graham, Active shape models—their training and their application, Computer Vision and Image Understanding 61, 38-59, 1995, in order to be able to introduce previous statistical knowledge into the object segmentation. Here for a number of pre-determined surfaces, which present variations of a shape, a surface model is issued by means of n landmarks, which are determined for each surface in such a manner that each landmark is present on each surface. For an object, a landmark vector is then determined, which contains all space coordinates for all n landmarks and is thus of the dimension 3n. The set of all landmark vectors forms a point distribution in $R^{3n}$. This point distribution is submitted to a main component analysis (in especially inhomogeneous distributions also a multimodal mix model a or even a kernel analysis) and the point distribution is characterized by means of a few proper values and proper spaces, which only represent a partial space of the original space. For the use of the model based segmentation the optimization problem is then solved which finds the object surface in the such determined partial space which adapts best possible to the image data. A further use is the extrapolution of registered data by means of the model, in order to rebuild best possible the surface of an object from few data (M. Fleute, S. Lavallée, Building a Complete Surface Model from sparse data using statistical shape models: application to computer assisted knee surgery, MICCAI'98, 880-887, LNCS Springer-Verlag, 1998). The "Active Shape Model" also allows to clearly visualize the differences of different objects of the same kind. But it has not been used for the quantitative analysis in (virtual or real) moving processes, neither for the automatic segmentation of the surface (or the space) in regions of homogeneous (spaciously linear) dynamic.

The present invention avoids the afore-mentioned disadvantages each alone or more preferred all together.

The present invention relates to a method and an apparatus for the precise and concise quantitative description of the global and local motion taking place in the image space and for the plausible presentation of the motion and the quantitative parameters with regard to the image space, the registration, the object/point tracking, the visualization and the determination of quantitative parameters of motion models and motion characteristics. In particular, the present invention relates to a method and an apparatus which allows to determine quantitatively the motion taken place, to quantify (in space and in time) and to visualize the conformity of object motion and reference dynamics as well as to detect and to spatially separate a few different motion types and to evaluate local motion phenomena. Furthermore, it allows due to a coarse-to-fine registration the detection and compensation of global motion mechanisms, which only allows the tracking in the embodiment shown (FIG. 1) and also permits a corrected visualization. The registration of the motion, which corresponds as best as possible to the real motion in the image space (in the entire space volume) is realized by a "splines à plaques minces" registration, which additionally allows to keep the number of motion parameters low. An entirely automatic cycle of all partial steps is possible.

The method according to the present invention comprises three parts or modules: module 1 "image pre-processing/point extraction", module 2 "registration" and module 3 "visualization/quantitative analysis", whereby module 2 and 3 may use different point sets extracted in module 1 and optionally module 2 may not use points (module 1). Module 3 uses the quantitative data determined by module 2.

Image Pre-Processing; Point Extraction

During the image preprocessing, structures of the image space are extracted as image points. In highly noisy images, the noise is first eliminated without destroying essential structures of the image. Depending on the structure of the image objects, a reaction-diffusion-operator (G. H. Cottet and L. Germain, Image processing through reaction combined with non-linear diffusion, Math. Comp., 61 (1993), pp. 659-673 or as an discrete equivalent; J. Mattes, D. Tysram and J. Demongeot, Parallel image processing using neural networks; applications in contrast enhancement of medical images, Parallel Processing Letters, 8: 63-76, 1998) or an operator of the anisotropic diffusion with an edge stop function on the basis of the tuckney standard (M. J. Black N S D. Heeger, IEEE Trans. on Image Processing 7, 421 (1998)) is used, by which the image is segmented into homogeneous regions. Other smoothing methods are the Gaussian smoothing or methods based on wavelets.

The preferred technique for the extraction of structures is the confinement-tree-technique (Mattes and Demongeot, Tree representation and implicit tree matching for a coarse to fine image matching algorithm MICCAI, 1999). Here, a gray value image is represented as tree structure. Here, each knot of the tree corresponds to a region (called confiner) of the image, which is defined by means of a given gray value level (as one of the coherence components of the set of all image points having an elevated gray value). The connection between the knots is determined by the subset relation between the regions, whereby only directly consecutive gray value levels are considered. According to criteria like too small area, gray value mass, etc. knots are deleted (filtration of the tree), among other, as they may be noise artifacts but also in order to reduce the number of points. As points either all gravity centers and/or all shape points of all confiners are extracted. In order to reduce the number of points, only those gravity centers may further be used, which correspond to knots, which follow directly on a bifurcation of the tree.

Alternatives for the point extraction are (i) using a Canny-Deriche edge-detector (R. Deriche, Using Canny's criteria to derive a recursively implemented optimal edge detector; Int. J. Comput. Vision, 1987, 167-187). (ii) extracting crestridge-lines (O. Monga, S. Benayoun and O. Faugeras, From partial derivatives of 3D density images to ridge lines, IEEE CVPR'92, 354-359, Champaign, Ill., 1992) or (iii) extremity points (J. -P. Thirion, New feature points based on geometric invariants for 3D image registration, Int. J. Comp, Vision, 18:121-137, 1996, K. Rohr, On 3D differential operators of detecting point landmarks, Image and Vision Computing, 15,219-233, 1997).

It is also possible, if this is considered to be helpful for the desired quantification, visualization or tracking by the user, to conduct an entire segmentation of the objects, by which objects are identified and shape points are assigned to the object. Therefore, as described in the following paragraph, a start form, e.g., a globe, is registered with the beforehand extracted points (in this case points which have been found by the Canny-Deriche edge-detector are to be preferred). For the segmentation of objects which have a clear contrast to their surrounding, it is sufficient to select a confiner, which fulfills one additional criteria, as, e.g., a maximum value (average gray value)/(number of the shape(boundary) pixels) or (area)/(number of shape pixels)$^2$. For the segmentation of small objects in highly noisy images, we proceed as Eils et al. in that a step of edge completion is succeeding a step of edge extraction (see above).

Finally, a point extraction is not necessary if the recording device already delivers points. This is the case for, e.g., laser scanners. Following the point extraction, the user has the opportunity to delete points or to select regions interactively.

Registration

The space in which images or point sets, or—more general—spatial data sets are present is called image space.

For the registration of two images (/spatial data sets) A and B, a parametrized transformation is exerted on one of the images (namely A in our terminology). The parameters are then determined in such a manner that the transformed image resembles as exactly as possible the other image and additionally a realistic deformation is described, which describes as well as possible the real deformation of the objects of the image space. Here, the similarity of one image to the other one is described by a functional (error functional). The functional is a function which assigns an error value to a given transformation, the error value decreases the better the images resemble each other. By an optimization algorithm the transformation parameter is determined such that the error functional becomes a local minimum.

Confiner assignment, evaluation and selection. The functional is preferably based on the points extracted during the image pre-processing. When the confiner shapes and confiner gravity points are calculated in both images, according to J. Mattes and J. Demongeot (SPIE Medical Image 2001) the corresponding confiners in the other image are searched for the confiners in the first image, whereby either the confiner with the least structural error (see also Mattes and Demongeot 2001, where the value of the structural error is referred to as relPos) or the one with the nearest gravity point is selected. Then pairs with too little similarities are deleted as being outliers (in order to determine this similarity relPos can be chosen again, but here it is possible to choose in relPos 1 as normalization factor; prior to the use of relPos, the confiners can be made locally affine). On the basis of the remaining pairs (e.g., their gravity points or shapes) the images are then overlapped. This process can be repeated iteratively, as due to the overlapping for a given confiner a better selection of the confiner corresponding to said given confiner has become possible. In a first evaluation of the iterative use of the method, the better results were achieved the less confiners were deleted during cutting down (which then lead to an increased calculation time) and for only 15% to 20% of the remaining confiner pairs (see FIG. 2) for the registration on the basis of the confiner gravity points. If the confiner shapes are used for registration, the individual identification of the confiner shapes has the advantage, that in the following steps only the next adjacent neighbor within the corresponding confiner shape has to be searched for a shape point. This identification, however, has to be repeated (step by step) for a part of the confiners, in case the following calculated transformation allows further assignments or a correction of the existing assignments becomes necessary. According to the evaluation of the confiner pairs by means of relPos (whereby the normalization factor in relPos can here be selected to be 1, too) the various confiner pairs in the error functional can be weighted differently (see also below).

Error functional. For the definition of the error functional (or error measure) the sets of extracted points of A and B (these sets are also indicated with A and B) are differentiated: The points of the set B are referred to as model points and the others as data point $a_i$ ($1 \leq i \leq N$). The transformation prototype T is defined as T: $R^3 \times \Pi \rightarrow R^3$, which depends on a parameter vector $P \in \Pi$ ($\Pi$ is the parameter space), and for each P a transformation T(P) of the space is obtained. The euclidic distance of a point x to the next model point is referred to as d(x, B). The summed-up quadratic distances represent the provisory error functional $C_{prov}$:

$$C_{prov}(P) = (1/\sigma) \Sigma_{i=1 \ldots N} \sigma_i (d(T(P, a_i), B))^2.$$

Here $\sigma = \Sigma_{i=1 \ldots N} \sigma_i$. The weight factors $\sigma_i$ facilitate the handling of outliers. The value of $\sigma_i$ depends on the distribution of all distances dj of the transformed data points $a_j$ to B and becomes 1 if $d_i$ is smaller than the average distance $<d_j>$, for higher values, this value decreases like a Gaussian aroung $<d_j>$. The standard deviation of this Gaussian is chosen as $<d_j>^2/\sigma_d$ whereby $\sigma_d$ is the standard deviation of the distances $d_j$. In order to avoid a repeated checking of all model points, a distance map can be established beforehand (Lavallée and Szeliski, IEEE Trans. PAMI, 1995) and be stored in an octree (as well as corresponding gradients of the such defined distance function, see below). Other alternatives are based on k-d-trees or the Voronoi diagram. A symmetric error measure is also possible, in which not only the distances of each data point to the model set is taken into account but also the distances of each model point to the data set, The use of a symmetric error measure leads in many cases to better results, but cannot be preferred in all cases due to its calculation complexity.

Alternatively, so-called iconic or gray value based error measures may be used (see, e.g., Roche, Malandaine, Ayache, Prima, MICCAI'99, LNCS Springer Verlag, 1999) which work without image processing and which determine the quality of a registration on the basis of a comparison of the overlapped gray values for a given transformation. This makes sense and is advantageous if the change of position between the various images is relatively small and the subsequent visualization and quantitative analysis are not based on extracted or segmented data.

Motion model and optimization (Fieres et al A point set registration algorithm using a motion model based on thin-plate splines and point clustering, in Pattern recognition, DAGM 2001, vol. 2191 of LNCS, 76-83, Springer-Verlag, 2001). The minimization of the above-described error functional alone is, however, not a criteria for a good overlapping. For example, the transformation, which transforms all data points into a certain model point, minimizes the (asymmetric) functional, but is not the desired solution. Other examples can easily be imagined, in which the pure minimization even of the symmetric error measure leads to undesired solutions.

It is, however, the aim to calculate a deformation which comes as close as possible to the natural deformation/motion of the object/the substance/material. Furthermore, after the registration, physical/anatomic corresponding points of the data and model set should overlap.

According to the present invention, there are several methods for limiting the solution space to realistic solutions. One possibility is to select an as realistic as possible (spatial) motion model, that is to find a suitable transformation prototype. For global transformations, preferred motion models are the rigid and affine transformation. As described in the following, local deformations are described by the displacement of check points of volume splines. In order to receive the transformation defined for the entire space, the check point displacement vectors are interpolated by the splines. Thin-plate splines are preferred ("splines à plaques minces", Duchon 1976, thin-plate splines, Bookstein 1989, see FIG. 3). In non-affine transformations, transformation prototypes are preferred by which suitable start positions of the check points can be determined (in the original image) and by which realistic (volume) transformations can be produced (see FIG. 3). These start positions are called A landmarks $p_k$ ($1 \leq k \leq n$, whereby n the number of A landmarks is) and the transformation prototype defined by them as $Tp_k$. The final position $q_k$ of the check points (in the target image) are called B landmarks. They are the free parameter of the transformation: $P=(q_1, \ldots, q_n)$. Thus, we have $Tp_k((q_1, \ldots, q_n), p_i) = q_i$ and $Tp_k(q_1, \ldots, q_n)$: $R^3 \rightarrow R^3$, $x \rightarrow Tp_k((q_1, \ldots, q_n), x)$. $Tp_k((q_1, \ldots, q_n), x)$ can be represented as a closed term, analytically derivable according to $P=(q_1, \ldots, q_n)$, as stated in Bookstein (1989). This facilitates to derive $C_{prov}$ as well as C (see following paragraph) according to P, which is of high importance for the optimization.

The motion model is additionally determined by the regularization technique, which introduces an additional term into the error functional which forces the minimization of the warp. The here used term $U_{bend} = U_{bend}(P)$ is the integral of the sum of all quadratic second derivations (with respect to the spatial coordinates x) of the transformation $Tp_K(P,x)$, integrated over the space $R^3$ (see Bookstein 1989). Thus, the error functional is $C = C_{prov} + \alpha U_{band}$.

As a second possibility the coarse-to-fine strategy is used whereby the number of free parameters of the transformation and thus also the accuracy of the overlapping is increased stepwise (see below). This strategy avoids undesired minima, as the optimizing algorithm used searches for solutions near the initializing values.

In the optimization according to the present invention the preferred (quadratic) error functional of the parameter vector P* has to be determined, which fulfills $C(P^*) = \min_{P \in \Pi} C(P)$. Here, the parameters for the transformation are preferably determined by the Levenberg-Marquardt algorithm. The herein needed gradient of the error functional according to $P=(q_1, \ldots, q_n)$ can easily be calculated due to the simple algebraic representation of $Tp_k((q_1, \ldots, q_n), x)$ (see above). This is true for the global as well as for the local registration.

For other functionals other optimizing strategies may be more sensible. In this context the following are to be mentioned: the down-hill Simplex algorithm, Simulated Annealing and others (Press et al. Numerical Recipes in C, 1992). For rigid and affine registrations, the optimization can also be made by the ICP algorithm (BesI and McKay, IEEE Trans. PAMI, 1992).

The registration procedure embraces three steps (coarse to fine), whereby the third step is further refined stepwise. From step to step, the number of free parameters of the transformation to be determined and, thus, the accuracy of the overlapping increases. First, a rigid registration is made by which the parameters for rotation and translation are determined. In the second step, it is registered affinelinearly, in the third step also local deformations are allowed. According to the present invention, the third transformation is limited to the above-described prototype which is determined by the A landmarks.

Principally, the A landmarks can be positioned everywhere. According to the present invention, they are set automatically and their number is increased stepwise; first, the best overlapping for a relatively small number of check points is determined (8 in the 3D examples described below, 4 in the 2D examples), resulting in the still relatively global transformation $T^{(1)} = Tp_k^{(1)}(P1)$ (according to the definition, $T^{(0)}$ is the identity). After the introduction of further check points (whereby the displacement vectors (i.e., B landmarks) are initialized according to $T^{(1)}$) the next more local transformation $T^{(2)}$ is achieved, etc., until the desired degree of locality is achieved.

The automatic positioning of the A-landmarks can, e.g., be made by an octree representation of the data points, whereby each cube of the octree contains a check point in its center. By varying the depth of the octree, the transformation can easily be refined stepwise.

The (preferred) automatic determination of the A-landmarks according to the present invention, however, consists in that each point $a_j$ of the data point set with its distance to the next point of the model set (or with the cube of this distance or any other monotone function of the distance) is weighted and that the k-means cluster-method (formular below, Fieres et al. 2001) is exerted to the such weight point set. The number of clusters can be chosen arbitrarily. It is increased stepwise in accordance with the coarse-to-fine principle. For a given degree of fineness v of the transformation, the cluster gravity centers $CS_i$ are thus defined in each step of the k-means method:

$$CS_i = (\Sigma_{j \in I_i} d(T^{(v)}(a_j), B)^3) / (\Sigma_{j \in I_i} d(T^{(v)}(a_j), B)^3,$$

whereby $I_i$ the set of indices of the data points is which is the very next to the $i^{th}$ cluster center. The cluster gravity centers $CS_i$, which are received after the convergence of the method are used as check points. They are in regions with still high distances between data and model points. For starting the method, the 8 corner points of the bounding box around the data point set are used. During our evaluations, the number of checkpoints has been increased stepwise by 1+3 v. FIGS. 4-7 show comparisons of both methods for setting the check points.

For the representation of the non-rigid transformation, also other methods can be considered, e.g, the octree spline by Szeliski and Lavallee (1994).

According to the present invention, in the third registration step—as described above—a weak regularization is made, i.e., a term is added to the error functional which punishes warp. It has been shown that the suppressing of excessive warp as well as the coarse-to-fine method improve the quality of the overlapping considerably in most cases (e.g., the correct assignment of logically corresponding points). Without these method steps, local shape characteristics are destroyed.

Reference dynamic. Reference dynamics can be selected which either can be fitted to the motion (transformation) found or can directly be fitted to the data if the reference dynamic can be represented as a parametrized transformation. Possible reference dynamics are, e.g., linear dynamic (affine transformation, with arbitrary time dependence), diffusion dynamic, Hamilton dynamic (e.g., hydrodynamic), elastic (harmonic) vibration. These dynamics can also be combined, simultaneously or sequentially.

Transformation over several time steps. The transformation (as well as the reference dynamic) is determined according to the present invention also between several time steps $t_{n-i}$ to $t_n$ to $t_{n+k}$. In order to avoid a summing up of errors, which would occur by a mere linking of the transformations between each two time steps, the following procedure is chosen: If the transformation to $t_{n+k}$ should be calculated starting from $t_n$, the same is made as described for $t_n, t_{n+1}, t_{n+2}, t_{n+3}$. By registration, the transformations $T_{n1}, T_{n2*}, T_{n3*}$ are calculated which register the images $t_n$ with image $t_{n+1}$, $t_{n+1}$ with $t_{n+2}$ and $t_{n+2}$ with $t_{n+3}$. We transform the image $t_n$ (or the corresponding extracted point set) by means of $T_{n2*} \circ T_{n1}$ ($T_{n2*}$ linked with $T_{n1}$), and register for correction purposes the resulting image again with the image from $t_{n+2}$. This delivers the transformation $T_{n2}$ between the images $t_n$ and $t_{n+2}$. Then we transform the image $t_n$ by means of $T_{n3*} \circ T_{n2}$ and register for correction purposes the resulting image again with the image from $t_{n+3}$. This delivers $T_{n3}$. Similar steps are taken for the transformation from $t_n$ to $t_{n-1}$, by using the method described for $t_n$. $t_{n+1}, t_{n+2}, t_{n+3}$ for $t_n, t_{n-1}, t_{n-2}, t_{n-3}$. If new structures (optionally given as further points) appear in an image, e.g., $t_{n+2}$, these, transformed by $T_{n3*}$, are added in a further preceding correction step to the image transformed by $T_{n3*} \circ T_{n2}$ before the correction registration with the image $t_{n+3}$.

Alternatively, e.g., in order to maintain $T_{n2}$, also image $t_n$ can be transformed by means of $T_{n1}$ and the thus achieved image (after the correction with new structures) can be registered with $t_{n+2}$. And so on.

For a (optionally only global) motion corrected reproduction of objects/images from the time steps $t_n$ to $t_{n+k}$ an absolute reference point in time is necessary. If $t_n$ is selected as such a time step, it is, in order to transform all images to $t_n$, an opportunity to calculate each inverse (first for the transformation between $t_n$ and $t_{n+1}$) In order to avoid the calculation of the inverses (at least in the non-rigid and non-affine case), it is in general the easiest way to register the points of $t_{n+1}$ on such of $t_n$. Combined with the method described above, this can be made between two arbitrary time steps.

In order to effect this in real time, i.e., simultaneously with the recording of the images, registration should be effected only twice for each new image. Therefore, the correction steps are performed as above, whereby first the transformation $t_{n+1}$ and $t_n$ is calculated and then between $t_{n+2}$ and $t_n$ (by using the first transformation), etc.

If this procedure is used in the case of a direct registration of the gray value images without a preceding point extraction, the gray values are transformed whereby the interpolation for the resampling for the reproduction on a regular discret grid (discretization) is used.

Regions of homogeneous motion. For the above-described registered point sets of the time steps $t_n$ to $t_{n+k}$, now the point distribution model already described in the part "description" is established Therefore, the main components are selected, which represent more than a % of the shape variations. Typical values are a=95% or a=90%. A given point on the surface/ in the space is then coordinated to the main component which leads to the highest distance d between the point displaced by the positive standard deviation (from the average model) in the direction of the main component and the point displaced by the negative standard deviation. Or alternatively leads to the highest value d/b whereby b is the eigen-value of the corresponding main component.

The points of each region of this segmentation can then be affin registered separately with the above-described deviation, in order to assign motion parameters to each sub region Object determination. If the points extracted during the image processing represent different objects, which are identified as such, these can be individually tracked or even registered after the registration of the image space. Therefore it is necessary to first identify each of the equal (or corresponding) objects in the different images. Differently to Eils et al (1989/9), it is only necessary to use a structural similarity measure (Mattes and Demongeot, SPIE Medical Imaging 2001) as the registration already moved the individual objects towards each other. The following individual registration is interesting, e.g., for images of cells in which the rotation or extension of the individual cells are of interest.

Visualization and Quantification

The calculation of the gray value image series which represents all gray value images of the series corrected by the motion of the reference dynamic (or also corrected by the entire registered motion) is a first visualization embodiment. The explicit calculation of the inverse is herein avoided stepwise as described above (see part "registration").

The image series recalculated in such a manner can then be animated and represented as video. But also all other methods of the analysis of image series and visualization can also be exerted thereon. In particular, these corrected image series are used, in case the motion corrected paths of individual objects should be visualized, which were tracked as described in the part "registration".

The present invention comprises several quantifying and visualization modules which can be used as listed below on its own or in combination.

According to the present invention, the motion of the object/image points should be visualized as well as the resulting quantitative values and these especially with regard to the image space.

This is achieved by encoding the points of the image space by color and/or by different patterns, which represent different values of quantifiable parameters (a continuous parameter is represented by a pattern becoming denser and denser).

Quantification and visualisation modules:

1) Segmented objects or selected confiners in the original image space are visualized as closed but transparent, 3D rendered (surface rendering) surfaces, in the target image space as triangulation grid (which has been transformed by the calculated transformation). Both are before as well as after the registration overlapped and (in different colors) represented (see FIG. 8). The only extracted points can also be represented in such a manner. According to the transformation found, intermediate steps are interpolated by means of a segmentation of the parameter interval (of the transformation parameter), the interpolated transformations are exerted on the original object the motion of which can then be represented animatedly.

2) The interactive confiner selection (with subsequent visualization) is effected either by clicking on a knot of a confinement-tree or by entering a gray value level and clicking on a spot of an image by which the confiner, containing the spot, is specified on the given level (or optionally no confiner). Without entering the gray value level the smallest confiner containing the spot in the filtered tree will be determined. The visualized surfaces can then also be represented overlapped with the target gray value image. In order not to cover the target gray value image, the parts of the surfaces above the examined level of the target gray value image can be cut off (see also 4c)). The overlapped representation also facilitates a visual control of the quality of the registration 3) The deformation is represented by a 3D rendered reference grid (surface rendering). This grid can be represented animatedly and can be overlapped with the surfaces or one of the gray value images (FIG. 8). For different color channels, the reference grids (and optionally the extracted points, too) are represented overlapped in different colors.

4) The color/pattern encoded (including gray value encoded) representation of quantified values, which have been calculated for each point in the image space, is effected in the following manner:
   a) Objects are segmented or confiners are selected, then the 3D rendered surface points are color/pattern encoded.
   b) Either characteristic points are determined by means of the original point set (see part Image pre-processing/point extraction and Mattes and Demongeot, SPIE Medical Imaging 2001 for the entire image space and Brett and Taylor, Image and Vision Computing 18:739-748, 2000 for points on the surface) or regular points are selected or the user clicks on at least one point in the space or on the segmented/confiner surface. For this/these the path with (error) color(/pattern) encoding is then shown (see FIG. 10).
   c) All points on a level through the space volume interactively determined by the user are represented color/pattern encoded. In the case of 2D images, this is the entire image space. FIG. 9 shows an example for the gray value encoded quantity velocity.
   d) In a) to c) the following quantities are shown in this manner.
      i) Error with regard to the reference dynamic (for extracted points) as an Euclidean distance between the point transformed with the reference dynamic and the next point in the target space (or from the originally same point transformed by means of the registration of the motion calculated;
      ii) standardized local warp (Bookstein, Principal Warps: Thin-plate splines and the decomposition of deformations, IEEE Trans. PAMI 11: 567-585, 1995, see also Duchon, Interpolation des functions de deux variables suivant le principe de la flexion des plaques minces, RAIRO Analyse Numérique, 10: 5-12, 1976) integrated over a globe of a given radius around a given point in the image space;
      iii) ii) for each principal warp (Bookstein, IEEE Trans. PAMI, 1995) and/or for different depths of the check point octree;
      iv) velocity, acceleration.
5) Visualization of the paths of tracked objects/confiners (color encoded).
6) Visualization of the paths (determined by registration) of surface points, which are defined (in the original image) either interactively or regularly distributed or as characteristic points (automatically calculated as in point 4b)).

7) Interactive deleting of points (e.g., in a bounding box) or surfaces or visualized paths.

8) Color encoding of the partitioning which according to the part registration assigns to each point in the space a motion main component (whereby regions with uniform motion type are achieved) and to each motion main component a color.

9) Visualization of the motion according to 1) for each main component, for each principal warp and/or for different depths of the check point octree.

10) Interpolation for animations and paths as described in 1).

11) Quantifying of global parameters, as global warp (particularly for each principal warp, but also for different depths of the check point octree), global errors with regard to the reference dynamic (particularly for each main component), parameter of the reference dynamic, for subsequent steps as well as over several time steps, as discussed in registration and bringing both values into a relation.

12) Local parameters, as velocity or acceleration, can be further analyzed with classic statistic methods, as e.g., histogram analysis (number of pixels for each value of the local parameter) or (density based) cluster analysis. Here the confinement tree analysis can be exerted on, e.g., the gray value encoded level determined in 4 c). This is shown in FIG. 9 and allows the abstracted description of the motion, which is suitable for a comparison of motions.

The homogeneity of the motion direction is characterized by the size of the cluster.

By means of a histogram, value ranges of local parameters can be identified (e.g., as 1D confiner), the values of which are particularly often in the image space. The corresponding pixels can be marked in the image/on the surface (e.g., as colored regions).

EXAMPLES

Examples for the use of visualization and of the methods for the quantitative analysis are: compensation of global microscope or cell nucleus motions (see FIG. 1), exemplarily visualization and quantitative analysis of the femur, see Fieres et al. (DAGM 2001) and FIGS. 8-10;

Usage for analyzing the cell membrane as well as the chromatin dynamic (FIG. 10), visualisation of paths of points in individual cells. Dynamic of grained structures in metal during the heating process;

analysis and visualization of the heart's, lung's motion; the growth of tumors but also in tissue microtomy;

dynamic of the cell nucleus envelope (membrane and lamina) during mitosis (particularly during the start stadium of its break down (FIG. 9, Beaudouin et al. Nuclear envelope breakdown proceeds by microtubule-induced tearing of the lamina. Cell Vol. 108, 83-96, 2002, Mattes et al. New tools for visualization and quantification in dynamic processes: Application to the nuclear envelope dynamics during mitosis. MICCAI 1323-1325, 2001).

The invention claimed is:

1. A method for the quantitative and visual analysis of motion in a time sequence of images comprising:
 using a computer-implemented to perform the following steps:
 a) determining the motion vectors for points in the image space between images of subsequent time steps by means of registration of images of an image sequence;
 b) reconstruction of the space-time-structure within the image space and visualization thereof by means of at least one of the following steps b1) to b4):
  b1) determining a point for a selectable moment, calculating automatically its position for other moments by a means of a transformation resulting from the registration as calculated in a) as well as determining and visualizing the interpolated representation of the path which relates to the determinined point and its calculated transformed positions as 3D rendered path;
  b2) determining and visualizing a 3D rendered reference grid, deformed according to the transformation calculated in a), where the grid is optionally displayed successively for intermediate degrees of deformation from an undeformed until the deformation corresponding to the transformation calculated in a) where in a image record having several color channels, the reference grids corresponding to the different color channels are separately treated;
  b3) color/pattern encoding (including gray value encoding) of quantities which are assigned to a point in the image/time space and where vector valued quantities are represented by a means of absolute values, for
   (i) all points, lying within an interactively selectable plane of the image space, or
   (ii) for any selected points or
   (iii) the points of the under b1) determinined path of the space; and
  b4) a motion corrected representation of the paths or of any other means of visualization described in b2)-b3), where the motion is corrected by undoing the part of the motion which corresponds to a selected class of transformations and which is calculated by registration.

2. The method according to claim 1, which extracts in a pre-processing step points of the image space and uses these in the steps b1), b3) and b4) instead of interactively selected points, whereby in step b2) the extracted points of the original image space can be used instead of the reference grid.

3. The method according to claim 2, which uses for the preprocessing the confinement tree technique (CTT), whereby
 the extracted points are surface points of regions in the image and for the visualization of the region, the user clicks the image, upon which the smallest confiners (in the filtered tree) containing said point will be shown.

4. The method according to claim 3, including means identifying objects in the image space in a segmentation step and calculating the surface points and the geometric center of these objects, whereby the objects play the role of confiners in claim 3, and including means determining for the segmented objects can also individual translations, rotation and deformations and correcting the object paths are individually selected transformation types.

5. The method according to claim 2, which uses for the preprocessing the confinement tree technique (CTT), whereby
 the registration is preformed on the basis of the extracted points by means of a point registration algorithm, whereby confiners corresponding to each other are predetermined in the original and target image.

6. The method according to claim 2, which uses for the preprocessing the confinement tree technique (CTT) whereby
 transferred confiner of the original image are displayed overlaying with non-transformed confiners of the target image whereby the confiners surfaces replace the parts of the reference grid in b2), and to the quantities from a3) the distance form one point to the next adjacent in the other image is added.

7. The method according to claim 1 including automatically comparing the transformation deterrmined with idealized dynamic reference types.

8. The method according to claim 1, wherein the registration step is a parametric non-rigid registration, wherein local transformation types are given stepwise from coarse to fine, first global and then increasingly more local.

9. The method according to claim 1, wherein for more then two time steps, the transformation obtained by registration in step a) is calculated in pairs for subsequent image pairs and also a correction-registration step is further added thereto.

10. The method according to claim 1, further comprising the step of determining form the transformation result for each point in the image/time space, the local quantities of velocity, acceleration, bending, tension, deviation from the finest registration as well as at least one of the global quantities of bending energy for the entire motion and as well as for "principal warp" separately, entropy, "directness" of the motion and transformation parameters for various fineness levels of the transformation.

11. A method implemented by a computer for registration by means of a confinement tree technique CTT, which uses one of,
  a) confiner center points (CS) or confiner density maxima (CD) as critical points for registration and by using the method of structural outlier determination starting from an initial overlapping first determines corresponding confiner pairs and thereby only maintains pairs with best relPos on the basis of this determines the best fitting transformation, exerts on the data confiner and repeats this process iteratively, whereby the such determined landmarks can be used for the establishment of a "point distribution model"; and
  b) corresponding confiners are determined as follows: for knots, which occur after a bifurcation in the confinement tree (CT) of one of the images, the knots having the lowest relPos value in the CT of the other image are searched, the point outliers are thereby suppressed then the relPos distribution for all confiner pairs are examined, and confiner outliers are eliminated temporarily, whereupon a point registration method under consideration of corresponding confiners is applied to the confiner surface or contour points and this process is repeated iteratively, by an optional usage of first highly cut-down CTs and then increasingly less highly cut-down CTs a coarse to fine effect can be achieved in a) and b), and wherein the images are first highly smoothed, and in the proceeding of the method increasingly less highly smoothed.

12. A method implemented by a computer for the registration of a data point (DP) set on a reference point (RP) set, which determines iteratively for a series of given transformation types, which allow an increasing number of local deformations, its free parameters in such a manner, that an error functional is minimized, which compares the positions of the transformed data points with those of the reference points, thereby selecting as transformation types first a rigid (rotation and translation), then an affine transformation and then transformation types, defined by a number of checkpoints, which can freely be displaced and between the displacement vectors of which with thin-plate splines is interpolated and, the number of control points is iteratively increased in order to allow an increasing number of local deformation, and the initial position of the control points is adapted to the shape formed of the data points and the reference points or the relative position thereof, particularly for the determination of the initial position of the control points a point-clustering-algorithm is exerted on the data point set, whereby each data point can be weighted depending on its distance to the next reference point, and cluster center are selected as the initial control point positions, and a sum of the quadratic distances of each DP to the next RP is selected as error functional whereby outliers can be suppressed based upon at least of: (i) starting from the distribution of the distances between the data points and the next reference point, all data points having higher distances as the median of the distribution are eliminated or (ii) instead of the quadratic distances another function of the distance is used.

* * * * *

UNITED STATES PATENT AND TRADEMARK OFFICE
CERTIFICATE OF CORRECTION

PATENT NO. : 7,590,264 B2  Page 1 of 1
APPLICATION NO. : 10/471153
DATED : September 15, 2009
INVENTOR(S) : Mattes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-first Day of September, 2010

David J. Kappos
*Director of the United States Patent and Trademark Office*